Aug. 11, 1931.    A. W. CAPS    1,818,462
PHOTOGRAPHIC APPARATUS
Filed Nov. 6, 1928    7 Sheets-Sheet 2
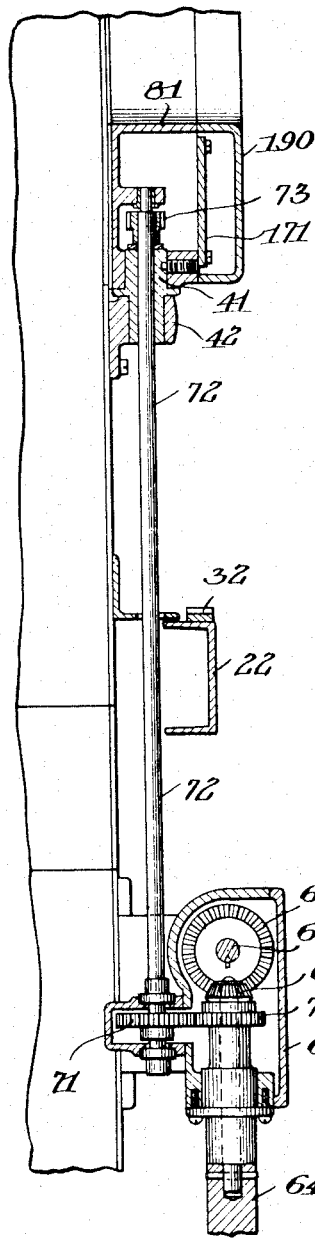
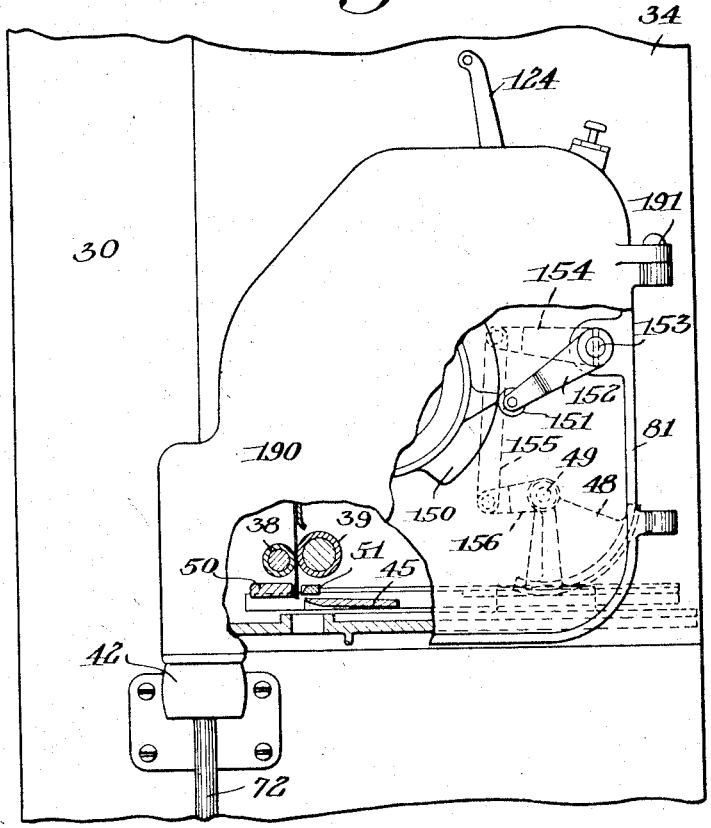
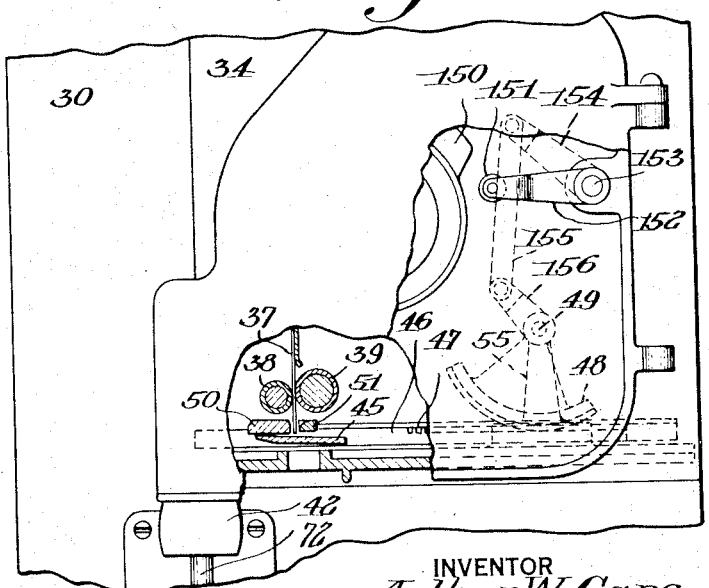
INVENTOR
Arthur W. Caps
BY Cumpston & Griffith
his ATTORNEYS Aug. 11, 1931.　　A. W. CAPS　　1,818,462
PHOTOGRAPHIC APPARATUS
Filed Nov. 6, 1928　　7 Sheets-Sheet 3
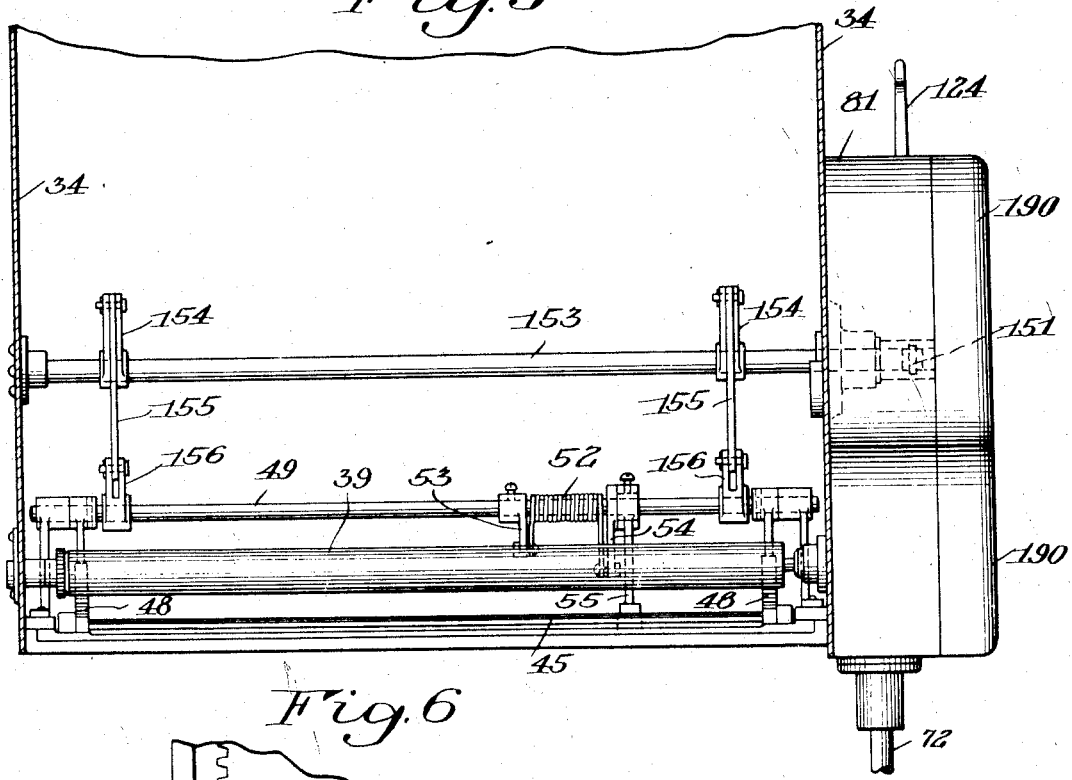
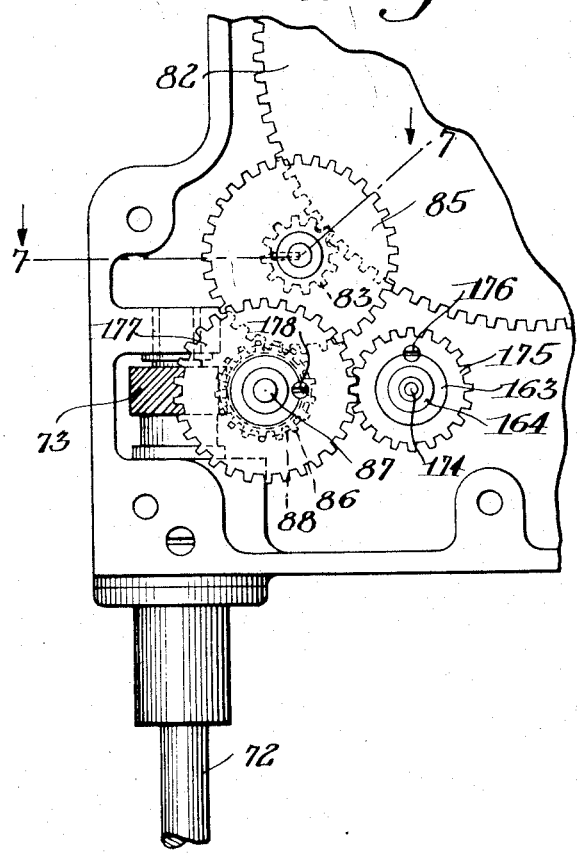
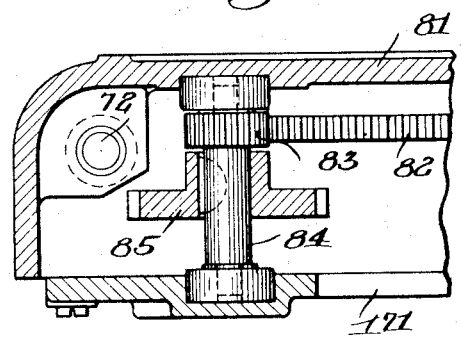
INVENTOR
Arthur W. Caps
BY
Crumpton & Griffith
his ATTORNEYS Aug. 11, 1931.   A. W. CAPS   1,818,462
PHOTOGRAPHIC APPARATUS
Filed Nov. 6, 1928   7 Sheets-Sheet 4

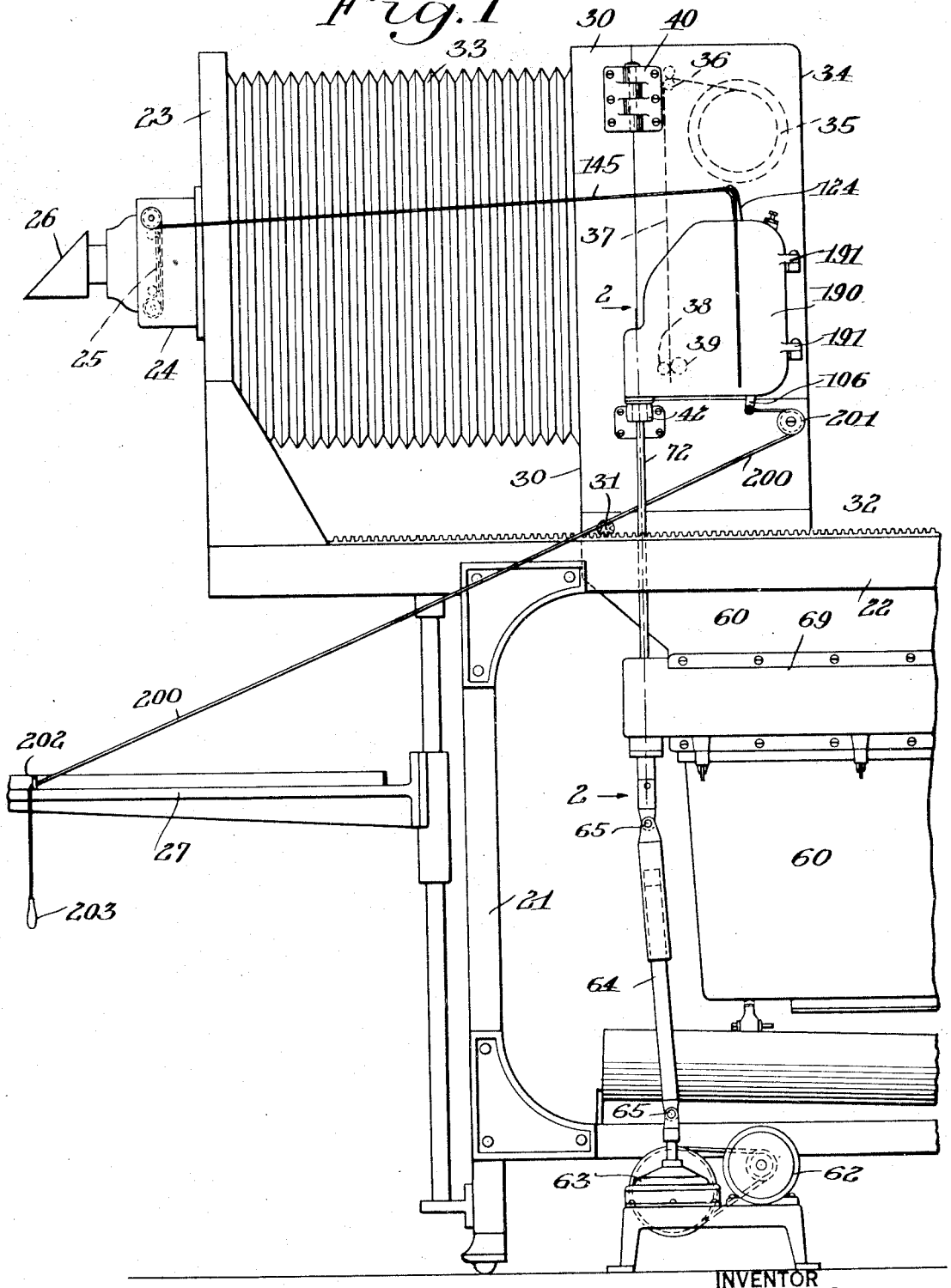

INVENTOR
Arthur W. Caps
BY
Cumpston & Gifford
his ATTORNEYS

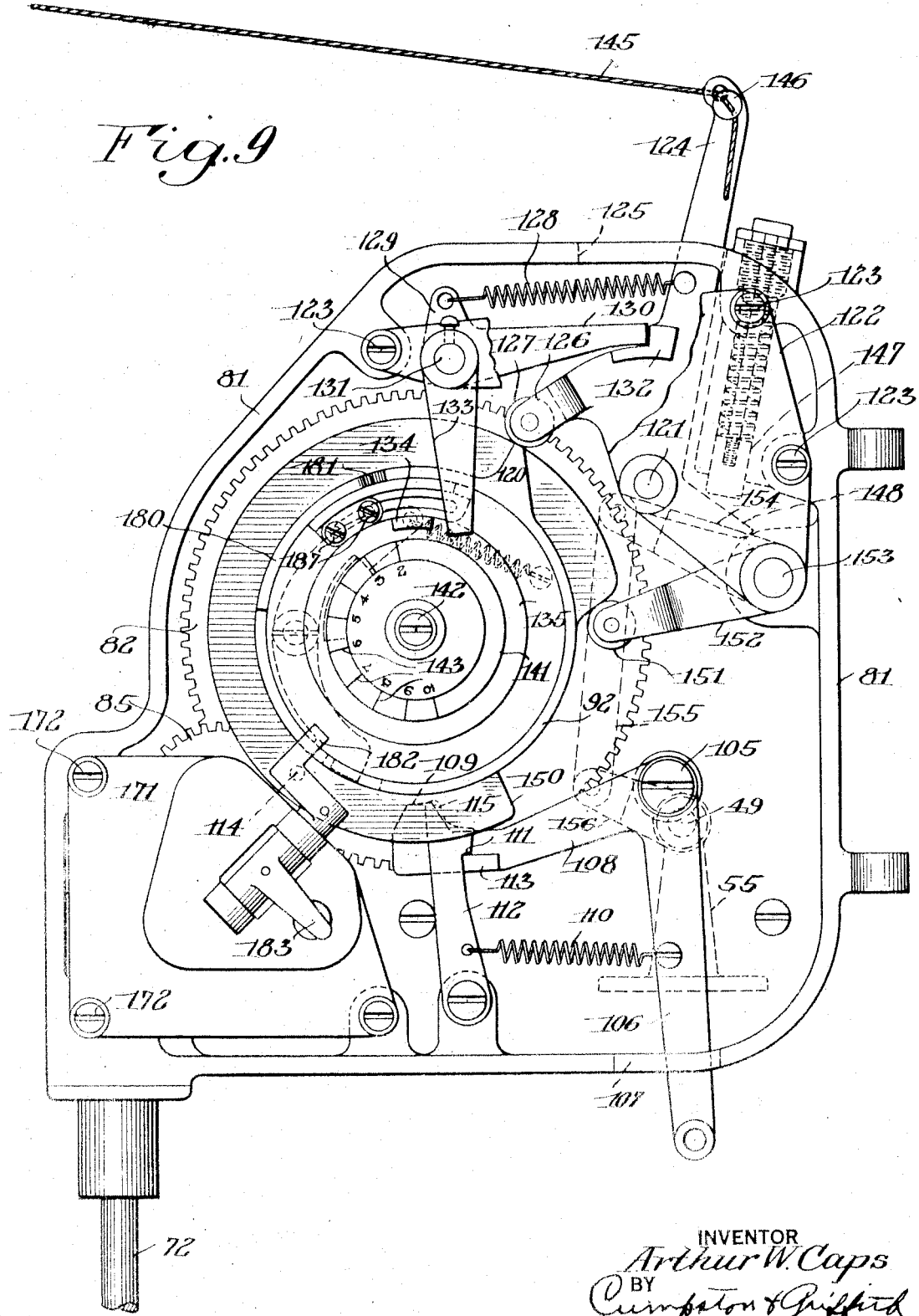

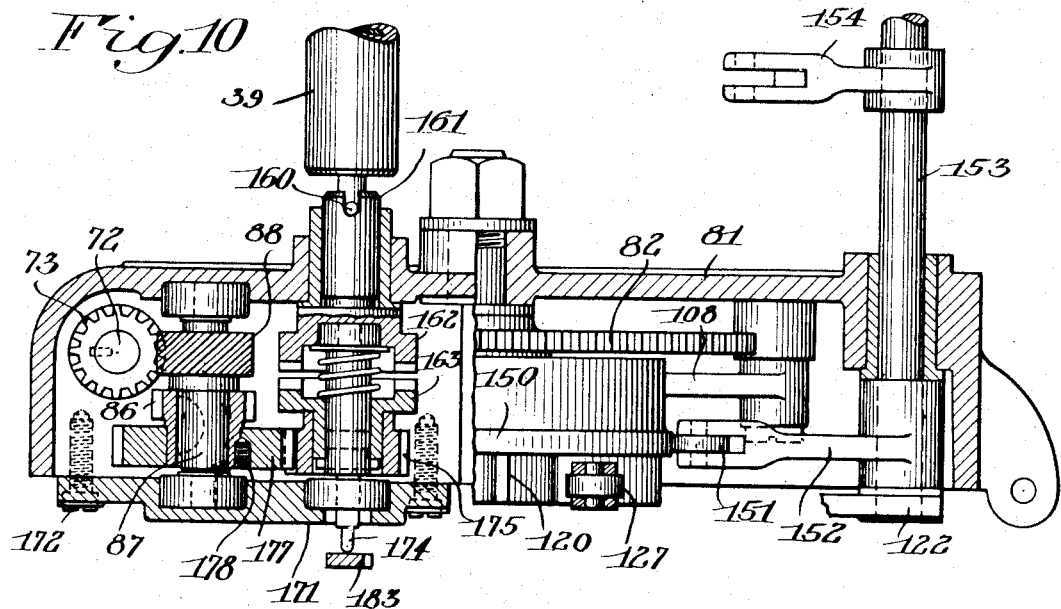

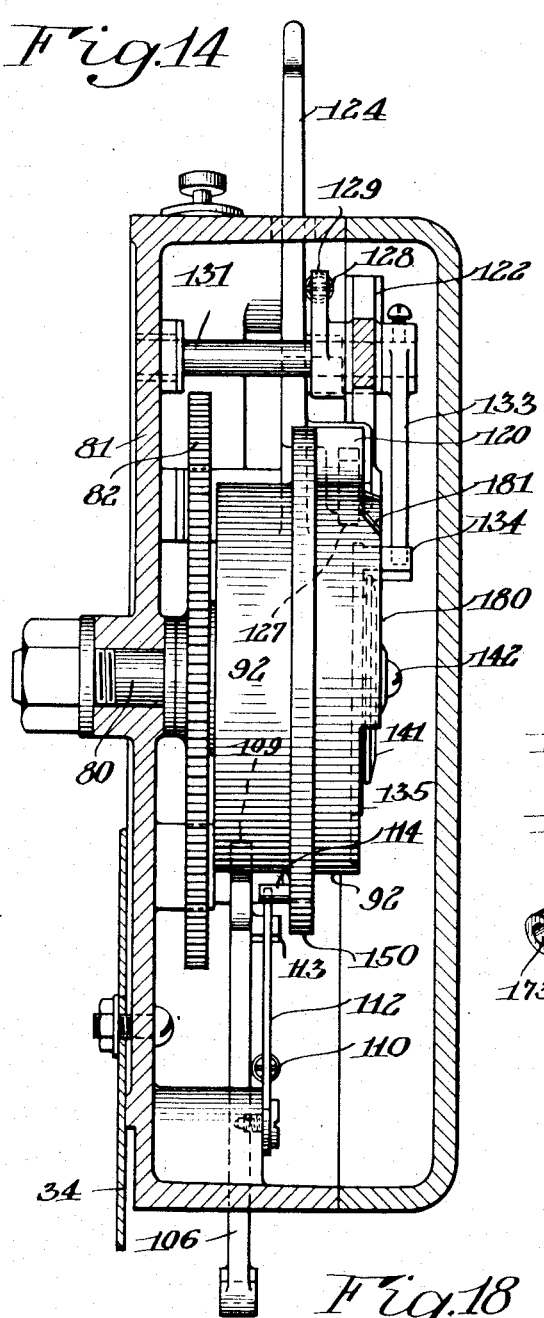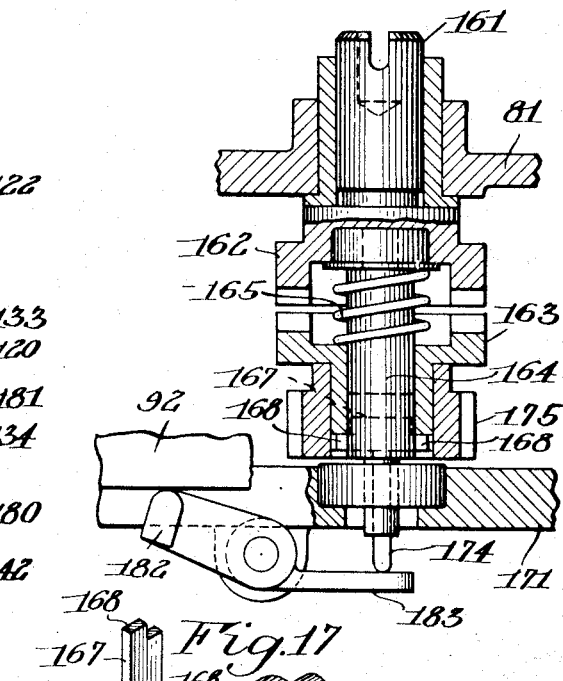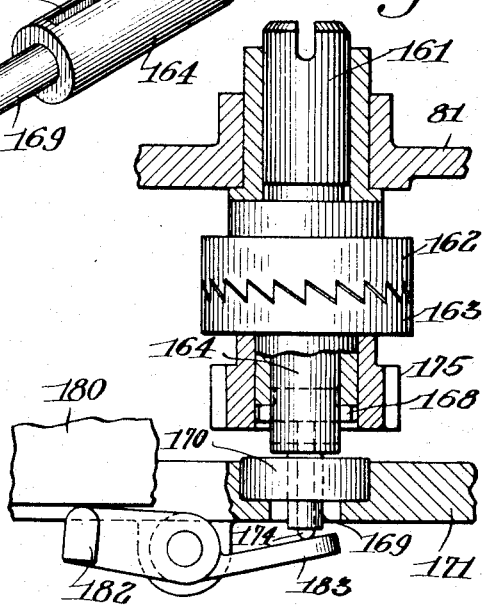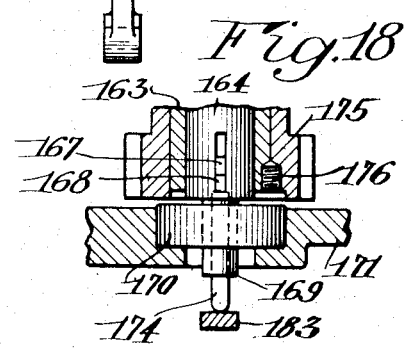

Patented Aug. 11, 1931

1,818,462

UNITED STATES PATENT OFFICE

ARTHUR W. CAPS, OF ROCHESTER, NEW YORK, ASSIGNOR TO PHOTOSTAT CORPORATION, OF PROVIDENCE, RHODE ISLAND, A CORPORATION OF RHODE ISLAND

PHOTOGRAPHIC APPARATUS

Application filed November 6, 1928. Serial No. 317,554.

This invention relates to photographic apparatus and particularly to a camera of the type in which exposures are made upon a portion of a strip of sensitized sheet material, the strip then being fed forwardly and the exposed portion thereof being severed from the rest of the strip. The principal object of the invention is to provide simple, efficient and satisfactory power driven means for operating the camera shutter, feeding the sheet material, and severing it automatically, when the device is set into operation by the operator of the camera.

Another object of the invention is the provision of means of the character above mentioned which may be applied easily and quickly to existing cameras, without necessitating extensive rebuilding or reorganization of them.

Another object is the provision, in a camera of the type having a copyholder at a point somewhat removed from the sheet feeding and severing devices, of efficient and satisfactory means which may be set into operation conveniently by the operator, when he is positioned adjacent the copyholder, for automatically operating the camera shutter and feeding and severing the sheet material.

Still another object is the provision of automatic power driven means of the type above set forth, in which the amount of sheet material fed by each operation of the device may be varied at will, and in which the length of exposure automatically made by the device may also be varied at will.

To these and other ends the invention resides in certain improvements and combinations of parts, all as will be hereinafter more fully described, the novel features being pointed out in the claims at the end of the specification.

In the drawings:

Fig. 1 is a side elevation of a camera and associated parts, showing a preferred embodiment of the invention applied thereto;

Fig. 2 is a vertical section taken substantially on the line 2—2 of Fig. 1;

Fig. 3 is a fragmentary elevation with parts broken away, illustrating the sheet severing element in its normal position;

Fig. 4 is a view similar to Fig. 3 illustrating the severing element in its retracted position to permit feeding of the sheet material;

Fig. 5 is a vertical section taken transversely through the camera body showing the sheet severing element and associated parts in elevation;

Fig. 6 is a fragmentary elevation of certain of the gears used in the automatic operating means of the present invention with parts removed, illustrating the drive for the control or cycle member and for the sheet feeding devices;

Fig. 7 is a section taken substantially on the line 7—7 of Fig. 6;

Fig. 9 is a view similar to Fig. 8 illustrating the control or cycle member near the beginning of its movement;

Fig. 10 is a horizontal section through the mechanism, the left hand portion of the section being taken substantially on the line 10—10 of Fig. 8;

Fig. 11 is a horizontal section taken substantially on the line 11—11 of Fig. 8;

Fig. 12 is a vertical section taken substantially on the line 12—12 of Fig. 11, illustrating details of the clutch mechanism for connecting the control or cycle member to its driving member;

Fig. 13 is an edge view of the control or cycle member, illustrating certain of the cams thereon;

Fig. 14 is an elevation of parts of the automatic mechanism, the housing surrounding it being shown in section;

Fig. 15 is a sectional view illustrating the construction of the clutch mechanism for operating the sheet feeding devices, the clutch being shown in open position;

Fig. 16 is a view similar to Fig. 15 showing the clutch in closed position;

Fig. 17 is a perspective view of the clutch shaft shown in Figs. 15 and 16, and of a key which is used in connection therewith, and Fig. 18 is a fragmentary sectional view of certain parts shown in Fig. 15, taken along a plane perpendicular to the plane of Fig. 15, illustrating details.

Similar reference numerals throughout the several views indicate the same parts.

Figure 8:
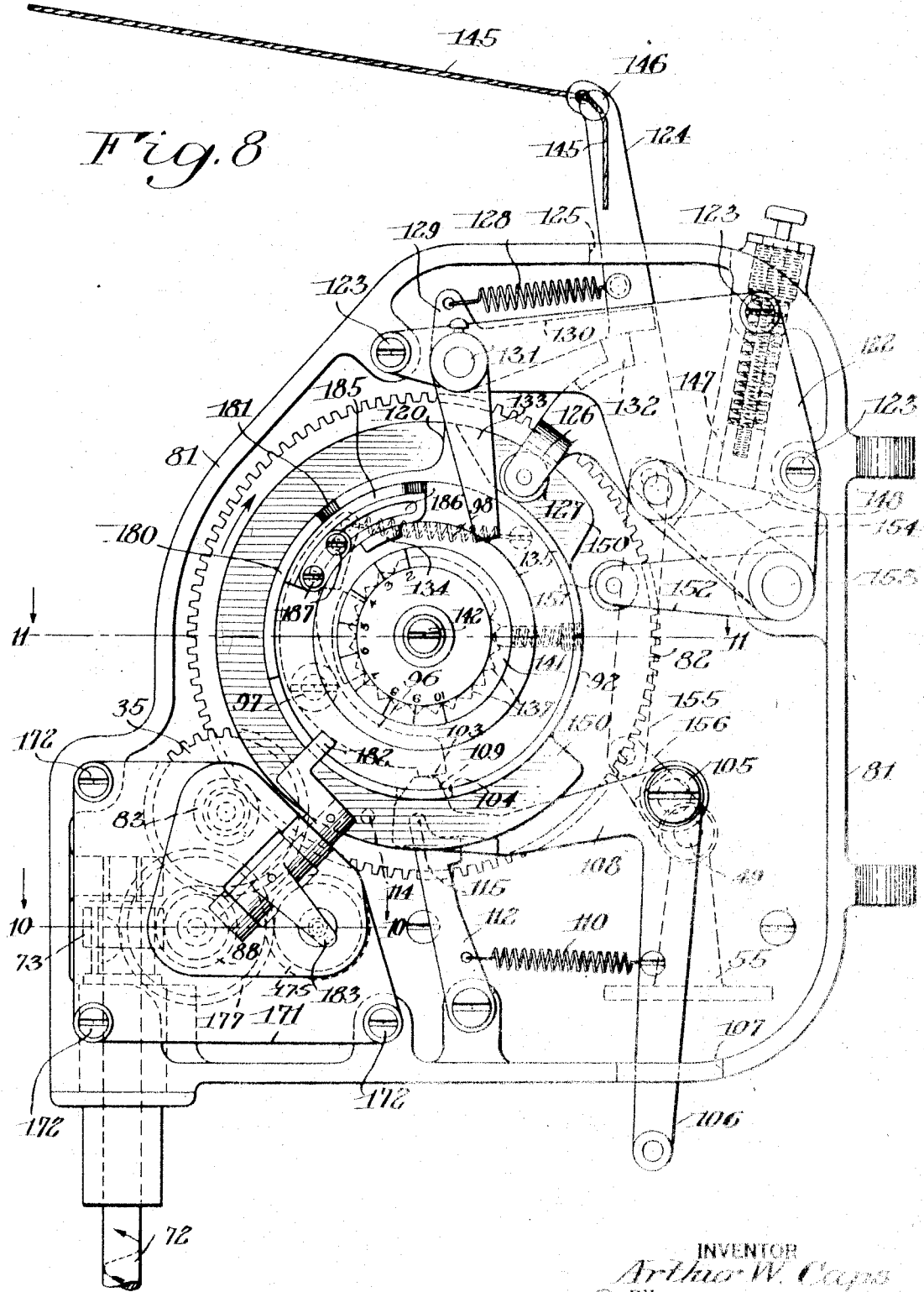
Fig. 8 is a general view of the automatic camera operating mechanism, with the cover removed to show the parts within, illustrating the control or cycle member in its position of rest.

Referring now to the drawings, and particularly to Fig. 1 thereof, there is shown a frame comprising vertical posts 21 and horizontal frame members 22 at the top thereof, a camera front 23 being supported on the front ends of the members 22. The camera front carries a casing 24 which may include one or more lenses and any suitable camera shutter, such as a shutter of the curtain type illustrated diagrammatically at 25. Preferably there is provided also a prism 26 for bending the light rays so that the camera may be used to photograph objects placed upon the copyholder 27 which extends forwardly substantially horizontally from the frame of the apparatus.

The camera body including a portion 30 is mounted on the horizontal frame members 22, and is preferably movable along these members in order to focus the camera, such focusing movement being controlled by means such as the pinion 31 mounted on the camera body and meshing with a rack 32 secured to the frame member 22. A bellows 33 may be used to connect the camera front 23 to the body portion 30.

Connected to the portion 30 of the camera body by suitable hinge means is the magazine portion 34 which is arranged to contain a roll of sensitized sheet material illustrated diagrammatically at 35, which sheet material may be led over rollers 36 and stretched as at 37 in the focal plane of the camera lens. Rolls 38 and 39, between which the sheet material is threaded, constitute feeding means for moving the exposed portions of the sheet material forwardly, as will be brought out below.

This magazine portion 34 is preferably hinged to the other body portion 30 in order that it may be moved to obtain access to the inside of these portions, for replenishing the supply of sheet material and for making any necessary repairs or adjustments. This hinged connection may include a hinge 40 near the top of the magazine portion, and at the bottom thereof, in alinement with the pivotal axis of the hinge 40, there may be a bushing or sleeve 41 (Fig. 2) attached to the magazine portion 34 and arranged to turn in a socket 42 secured to the body portion 30, thus providing another hinge.

Referring now especially to Figs. 3, 4, and 5, there is shown below the feeding rolls 38 and 39 a sheet severing element which may be in the nature of a reciprocating knife blade 45 having its ends mounted on slide members 46 provided with rack teeth 47 to be engaged by cooperating teeth on rack segments 48 secured to a shaft 49. The sheet material when fed downwardly by the feed rolls 38 and 39 passes through a slot between bars 50 and 51, the severing element 45 meanwhile being withdrawn or retracted to the position shown in Fig. 4. When the severing element next moves forwardly toward the position shown in Fig. 3, it severs that portion of the sheet material below the bar 50 from the portion in the focal plane above this bar, allowing the exposed severed piece to drop downwardly into a suitable receiver or chute of known construction.

A spring 52 may be coiled about the shaft 49 as shown in Fig. 5, one end of the spring being attached to an arm 53 secured to the shaft, while the opposite end is attached to an arm 54 held stationary by a supporting member 55 which serves also as a bearing for the shaft 49. The spring 52 tends to turn the shaft 49 in clock-wise direction when viewed as in Figs. 3 and 4, so that the severing element 45 is normally thrust forwardly to the position shown in Fig. 3 by reason of the action of the segments 48 on the rack bars 46. When the severing element is retracted from the position shown in Fig. 3 to that illustrated in Fig. 4, by mechanism to be described later, and is then released, the spring 52 will act to drive the severing element forwardly to sever the sheet.

Below the camera body and extending rearwardly therefrom may be a casing the forward end of which is shown at 60 in Fig. 1. This casing may contain mechanism for conveying the severed sheet to any desired point, preferably including also print developing, washing, and fixing baths, so that the exposed and severed sheets may be transformed into finished photographic prints.

Any suitable driving means may be provided for the print treating mechanism, such as the motor 62 which drives, through suitable gearing within a gear box 63, the shaft 64, provided with universal joints 65. The upper end of this shaft 64 may have a bevel gear 66 (Fig. 2) which meshes with another bevel gear 67 on a shaft 68 positioned horizontally within the housing 69 which extends along the casing 60 in which the print treating mechanism is housed. It will be understood that the various moving parts of the print treating mechanism may be driven from this shaft 68. The universal joints 65 in the shaft 64 are provided because the shaft 68 and the casing 60 on which it is mounted are preferably connected to the camera body 30, so that they move back and forth as a unit with this camera body when the latter is shifted relative to the camera front 23 in order to focus the camera.

The automatic mechanism for operating the shutter and feeding and severing the sheet material may be driven from any suitable source of power, preferably from the same motor 62 which drives the print treating mechanism. For instance, as shown in Fig. 2, the upper end of the shaft 64 may have a spur gear 70 mounted thereon which may mesh with another gear 71 on a vertical shaft 72 extending up the side of the camera body 30 and passing through a central opening in the sleeve 41 which forms one of the hinges of the magazine portion of the camera, as has been mentioned above. The shaft 72 is provided, above the sleeve 41, with means such as the spiral gear 73 for driving the automatic control mechanism now to be described.

Referring first to Figs. 8 and 11, there is provided a stud 80 mounted on a boss formed on a wall of a casing 81 secured to the side of the magazine portion 34 of the camera body. A gear 82 is rotatably mounted on the stud 81 and is preferably driven constantly in a clock-wise direction when viewed as in Fig. 8 by suitable driving mechanism connecting it to the shaft 72. This driving mechanism, best shown in Figs. 6 and 7, may include a pinion 83 meshing with the gear 82 and mounted on a shaft 84, which shaft also carries a gear 85 which is driven by a pinion 86 on a shaft 87 (see also Fig. 10). This shaft 87 carries a spiral gear 88 which meshes with the spiral gear 73 on the shaft 72.

The constantly driven gear 82 may be provided with a sleeve portion 90 surrounding the stud 80 and extending some distance along this stud, as shown in Fig. 11. Rotatably mounted on a bushing 91 on the sleeve 90 is a control or cycle member indicated generally by the numeral 92.

This control member is provided with mechanism which, when actuated, serves to connect the control member to the rotating gear 82 for a predetermined interval (preferably for one complete revolution) and which then automatically disconnects the control member from the gear at the end of this interval. One possible form of such connecting mechanism is illustrated in Figs. 11 and 12, and comprises an annular recess or cavity 95 formed in the inner face of the control member 92. A lever 96 within this cavity 95 is pivoted on a stud 97 secured to the control member and has one end connected to an end of a spring 98 whose opposite end is attached to a stud 99 on the control member within the cavity 95. This spring tends to move the member 96 in a clock-wise direction when viewed as in Fig. 12, and to bring a nose 100 thereon into the path of a lug 101 extending outwardly from the face of the gear 82.

The opposite end of the member 96 has a portion 102 arranged to contact with the outer wall of the annular recess 95 to limit the motion of the member 96 under the influence of the spring 98, and also has a tail 103 in position to extend through an opening 104 in the outer wall of this recess. It is obvious from Fig. 12 that when the parts are in the position there shown, the control member 92 is connected to the gear 82 so that it turns therewith. If the member 96 be shifted in a counterclock-wise direction, however, the nose 100 thereof will no longer be in the path of the lug 101 and the gear 82 may then rotate freely without moving the control member 92.

For actuating the clutch mechanism above described, there may be provided a bell crank lever pivoted on a stud 105 in the casing 81, as shown in Figs. 8 and 9. This bell crank lever has an operating arm 106 extending outwardly through an opening 107 in the bottom wall of the casing 81, and also has an arm 108 provided with a nose 109 which is arranged to extend through the opening 104 of the control member 92, as shown in Fig. 8, to cooperate with the tail 103 and thus shift the member 96 to a position in which the control member is disconnected from the gear 83. A spring 110 tends to move the bell crank lever in clockwise direction, and is sufficiently strong so that it overcomes the spring 98.

To set the mechanism in operation, the lower end of the arm 106 of the bell crank lever is moved rearwardly, or to the right when viewed as in Figs. 8 and 9. This withdraws the nose 109 from cooperation with the tail 103 and permits the spring 98 to draw the nose 100 on the member 96 into the path of the lug 101. The movement of lug 101 and gear 82 is thus transmitted through the member 96 to the control member 92, so that the control member rotates with the gear. Meanwhile, a shoulder 111 on a latching lever 112 has snapped over a lug 113 on the arm 108 of the bell crank lever, as shown in Fig. 9, and thus serves to hold the nose of the bell crank lever out of cooperation with the tail 103.

Shortly before the completion of one revolution of the control member 92, a pin 114 on this control member comes into contact with the end 115 of the latching lever 112, and moves this end leftwardly, withdrawing the shoulder 111 thereon from the lug 113 so that the nose 109 of the bell crank lever is moved upwardly by the spring 110 into contact with the periphery of the control member 92. As the opening 104 comes opposite this nose 109, the nose enters the opening, elevates the tail 103, and thus disconnects the control member 92 from the gear 82 at the end of one complete revolution.

The control member 92 carries on its periphery a cam 120 the effective surface of which extends obliquely outwardly, as is indicated in Figs. 8 and 9. This cam is for the purpose of operating the camera shutter, and its normal position, when the control member 92 is at rest, is substantially at the top of the control member, as shown in Fig. 8.

A shutter operating member may be pivotally mounted on a stud 121 which extends between the inner wall of the mechanism housing 81 and a plate 122 secured to the housing by means such as screws 123. This shutter operating member comprises an upstanding arm 124 extending through and movable in a slot 125 in the top of the housing 81, which arm carries a forked leftward extension 126 in which a roller 127 is mounted, this roller being arranged to ride up the inclined forward surface of the cam 120 when the control member 92 rotates.

A spring 128 is connected at one end to the shutter operating arm 124 so that it tends to pull this arm forwardly or to the left when viewed as in Figs. 8 and 9. The other end of this spring is connected to a short upstanding arm 129 on a latch 130 which is secured to a shaft 131 journalled in the inner wall of the casing 81 and in the plate 122 above mentioned. As the control member 92 rotates, when it is connected to the rotating gear 82, the roller 127 rides up the cam 120 and forces the shutter operating member 124 rearwardly, against the tension of spring 128, from the position shown in Fig. 8 to that shown in Fig. 9. During this movement the latch 130 drops into a notch formed on a lug 132 on the shutter operating member 124, thus retaining the operating member in the position shown in Fig. 9 after the cam 120 rides out from under the roller 127, until the latch 130 is tripped.

Adjustable mechanism is preferably provided for tripping the latch, so that the interval between the movement of the member 124 in one direction and its return movement in the opposite direction may be varied at will to vary the length of exposure. This mechanism for tripping the latch may include an arm 133 mounted on the outer end of the shaft 131 and extending down partially over the front of the control member, as shown in Figs. 9 and 14, to a position in which it may be contacted and moved by an adjustable element on the control member. In the present instance, this adjustable element may comprise a lug 134 extending outwardly from the face of a plate 135 which is provided with an inwardly extending cylindrical flange 136 rotatably mounted on the control member 92 concentric with the axis of rotation of this member, as best shown in Figs. 8 and 11. This cylindrical flange 136 is provided with a series of circumferentially arranged teeth or notches 137, which cooperate with a ball 138 pressed against them by a spring 139 held in an opening in the control member 92 by a plug 140.

A plate 141 is mounted upon a squared portion at the end of the stud 80 by means such as the screw 142, and serves to retain the member 135 on the control member 92 and also to retain this control member and the gear 82 on the stud 80 on which they are mounted. The retaining plate 141 preferably has beveled edges provided with graduations 143 to assist in setting the latch tripping lug 134 in desired position. The graduations of the plate may be numbered in seconds as shown in Figs. 8 and 9, or in any other way desired.

In using this device, the plate 135 is set so that the forward edge of the lug 134 is opposite the graduation indicating the desired length of exposure, when the control member 92 is in its position of rest. In Fig. 8, for instance, the lug is set for an exposure of two seconds, as is plainly shown. It may easily be moved to another position when desired simply by grasping the lug and moving it with sufficient force to overcome the resistance of the detent ball 138 and spring 139. The detent spring is sufficiently strong to hold the lug against displacement by contact with the latch tripping arm 133. As the control member 92 rotates, the cam 120 moves the shutter operating member 124 to the right, as has been previously described, and the latch 130 holds it in this position. Upon continued rotation of the control member 92, the lug 134 comes into contact with the arm 133 and thus turns the shaft 131 in a counter-clockwise direction, elevating the latch 130 and releasing the shutter operating member so that the latter is moved leftwardly to its initial position by the spring 128. Obviously the latch may be tripped or released earlier or later by shifting the lug 134 to different positions on the control member 92, thus varying the time of exposure as desired.

As the shutter operating member returns under the influence of spring 128, when the latch 130 is tripped, its movement may be cushioned and brought to a smooth stop by the dashpot or spring plunger 147 (Figs. 8 and 9) which is contacted by the arm 148 on the shutter operating member, as the latter nears the end of its return stroke.

The shutter operating member 124 may be arranged to operate a shutter in any convenient manner. For example, the curtain shutter 25 shown in Fig. 1 is connected to the member 124 by a cord 145 so that rightward movement of the member 124 pulls this cord to open the shutter, while leftward movement allows the shutter to close. In focusing the camera, the automatic mechanism on the magazine 134 is moved toward and from the shutter, as has been mentioned above. For this reason, the cord 145 must be lengthened or shortened after each focusing operation, and this may conveniently be done by extending the cord through an eye in the member 124 and by providing any suitable stop member 146 slidable along the cord and held thereon frictionally with sufficient resistance to produce the necessary pull on the cord when the member 124 is operated.

The control member 92, in addition to operating the camera shutter, is also provided with mechanism for feeding the sensitized sheet material subsequent to the exposure, and for severing the exposed portion. It has been mentioned above that the severing element 45 normally extends across the path of travel of the sheet material as it is fed, as shown in Fig. 3, and for this reason the severing element must be retracted prior to the feeding operation.

The means for retracting the severing element may comprise a cam 150 on the control member 92, which cam is in the nature of a flange extending radially outward as shown in Figs. 8, 11, and 14. This cam is arranged to cooperate with a follower roller 151 on an arm 152 fixed to a shaft 153 (Figs. 3, 4, 5, 8, 9 and 10) which passes through the inner wall of the mechanism housing 81 and extends into and across the magazine 34 as shown especially in Fig. 5. Arms 154 on this shaft are connected by links 155 to arms 156 on the shaft 49, so that as the shaft 153 turns counter-clockwise the shaft 49 will likewise be turned counter-clockwise to retract the severing element 45 by means of the sector 48 and rack bars 46, as has been described above.

When the control member 92 is operatively connected to the rotating member 82 by moving the arm 106, the inclined leading edge of the cam 150 comes into contact with its follower roller 151 at about the same time that the shutter operating cam 120 engages and shifts its follower roller 127. Fig. 9 shows the shutter operating arm 124 completely shifted to open the shutter by the cam 120, and also shows the severing-element-operating cam 150 in the act of engaging and shifting the roller 151, thus turning the shaft 153 to retract the severing element 45. As the control member 92 continues to rotate, the roller 151 rides on the periphery of the cam 150 and holds the severing element retracted until near the end of the revolution of the control member, when the roller 151 drops off of the rear end of the cam 150. This allows the spring 52 to advance the severing element from the position shown in Fig. 4 to that shown in Fig. 3, thus severing the sheet which has meanwhile been fed downwardly by the rolls 38 and 39.

During the time that the severing element 45 is held retracted by cooperation of the roller 151 with the cam 150, the sheet material is automatically fed forwardly by the mechanism now to be described, referring particularly to Figs. 6, 8, 10, 15 and 16.

One of the feed rolls, such as 39, is provided with a pin 160 near one end of its shaft, which pin is received in a groove in a short shaft 161 (Figs. 10 and 15) which is journalled in the inner wall of the housing 81 and which carries a clutch element 162 arranged to cooperate with another clutch element 163 longitudinally slidable on a shaft 164, the inner end of which is reduced and journalled in a socket in the shaft 161, so that the shafts 161 and 164 are in axial alinement with each other. A spring 165 surrounds the shaft 164 between the clutch elements 162 and 163, tending to separate these elements to disconnect the clutch.

The shaft 164 has a slot 166 therein, as is best shown in Figs. 15, 16 and 17, and a key 167 of the shape shown in Fig. 17 extends diametrically through this slot. The length of the slot 166 is greater than the width of the key 167, so that this key may move in a direction of the axis of the shaft. The key has extensions 168 at each end which project radially past the periphery of the shaft and which are received in slots or keyways in the clutch element 163. The outer end of the shaft 164 is reduced as at 169 and journalled in a ball bearing 170 supported by a plate 171 which is attached to the housing 81 by screws 172 (Fig. 8). An axial bore or opening 173 is formed in the shaft 164 from the outer end thereof to the slot 166, and a pin 174 is loosely mounted within this bore so that it may slide axially therein, the pin having its inner end in contact with the key 167 and its outer end projecting somewhat from the end of the shaft 164 as is shown in Fig. 15.

From the foregoing description, it will be obvious that if the pin 174 is pressed inwardly in an axial direction, it will press against the key 167 and move this key inwardly, thus causing axial movement of the clutch element 163 to bring the clutch teeth thereon into cooperation with the clutch element 162, so that the clutch will be closed. If the pressure on the pin 174 be released, the spring 165 will move the element 163 outwardly along the shaft 164 to open the clutch. If, therefore, means be provided for driving the clutch element 163, it is obvious that the clutch may be opened and closed to operate the feeding rolls as desired.

Any suitable mechanism may be employed for driving the clutch element 163. In the present instance this mechanism comprises a spur gear 175 mounted on the hub portion of the clutch element 163, and operatively secured thereto by means such as the screw 176 shown in Figs. 6 and 18. This gear meshes with a spur gear 177 which may be secured by a similar screw 178 on the hub of gear 86 which has been mentioned above. It will be recalled that gear 86 is keyed to the shaft 87 which is driven through the spiral gears 88 and 73 from the source of power. In this way, the clutch element 163 is driven preferably continuously.

The mechanism for closing the clutch 162, 163 is preferably actuated by the control member 92, and may include a cam 180 formed on the control member 92 and projecting outwardly from the face thereof as shown in Fig. 11. The forward edge of this cam is inclined as at 181 (Figs. 8 and 13) so that during rotation of the control member it may ride under and lift an arm 182 (Figs. 8 and 9) on a shaft journalled on the plate 171, which shaft is provided also with an arm 183 overlying the end of the clutch operating pin 174. When the cam 180 shifts the arm 182, it rocks the arm 183 thus moving the pin 174 inwardly to close the clutch, this action being illustrated in Fig. 16, in which the cam 180 and arm 181 are shown diagrammatically. When the arm 182 rides off of the end of the cam 180 upon continued rotation of the control member 92, the spring 165 acts to open the clutch as shown in Fig. 15. Thus, during the interval while the cam 180 is cooperating with the arm 182, the clutch 162, 163 is closed and the sheet feeding devices are operatively connected to the source of power so that they feed the strip of sheet material forwardly. This occurs, as has been mentioned above, while the roller 151 is riding upon the cam 150, so that the severing element is then withdrawn from the path of travel of the sheet material.

It is sometime desirable in photographic apparatus of this character to make an exposure of only a portion of the maximum sized sheet which may be exposed. Accordingly, it is desirable to have the sheet feeding mechanism of such character that it may be adjusted or varied to feed either a full sized sheet, when exposures are being made on the full sheet, or only a portion of the full sheet, if the exposures are being made on only a portion of the sheet.

In the present instance, the cam 180 is made of such size that it produces the minimum amount of feeding which would normally be desired, and a supplementary cam 185 (Figs 8 and 13) is mounted adjustably so that it may be used to vary the effective length of the cam 180 to increase the extent of feeding any desired amount up to the maximum extent used for a full sized sheet. This supplementary cam has an arcuate upstanding portion which lies along the side of the cam 180, as plainly shown in Fig. 8, and has a base portion arranged to lie against the flat front face of the control member 92. This base portion has an arcuate slot 186 through which clamping screws 187 pass, these screws being threaded into the member 92.

By loosening the screws 187, the supplementary cam 185 may be moved to various positions circumferentially of the control member 92, and thus may be set to add any desired effective length to the cam 180. When so set, it forms, in effect, a continuation of the cam 180 and acts in the same way as the latter to shift the arm 182 to close the clutch. In Figs. 8 and 9, the supplementary cam 185 is shown advanced approximately to its maximum position, which would thus cause the maximum extent of feeding of the sheet material. When it is desired to set the mechanism for feeding a lesser amount of sheet material, the forward inclined edge of the supplementary cam 185 is moved farther back (that is, closer to the inclined edge 181 of the cam 180) so that the total length from the forward edge of the cam 185 to the rear end of the cam 180 is lessened. In this way, the clutch 162, 163 is held closed for a less time, which results in less feeding of the sheet material.

The various parts of the mechanism may be protected from dust and dirt by a cover 190 (Figs. 1, 5 and 11) arranged to close the outer or open side of the casing or housing 81. This cover 190 may be hinged as at 191 to the housing.

It has been explained above that the articles to be photographed are placed upon a copyholder 27 (Fig. 1) extending forwardly from the frame of the apparatus. Since the operator of the apparatus must be near this copyholder in order to arrange the articles thereon, it is desirable to provide means accessible to him from such position for operating the automatic exposing, feeding and severing mechanism, so that he will not have to waste time by moving to another part of the apparatus after arranging the articles in order to operate the camera. Accordingly, suitable operating means such as the flexible cord 200 is provided, one end of this cord being attached to the actuating member 106, the cord extending thence over the pulley 201 mounted on the camera body 30 and extending forwardly to a point adjacent the copyholder 27. The end of the cord may be passed through an eye 202 on the copyholder, and a handle 203 may be provided, the weight of which will keep the cord reasonably taut.

The operator may stand or sit at the side of the copyholder 27, the articles to be photographed being placed on a bench or table within his reach. He may then arrange certain of the articles on the copyholder, and immediately, without leaving his position, he may pull the cord 200 to set the automatic mechanism in operation, so that the apparatus will automatically make an exposure, feed the sheet material, and sever it. The moment the exposure is completed (which completion the operator may observe by watching the movement of the shutter operating arm 124) he may remove the photographed articles from the copyholder 27 without waiting for the feeding and severing operation to take place, and may arrange other articles to be photographed on the copyholder. Thus an extremely efficient apparatus is provided in which exposures may be made in rapid succession, the articles being arranged on the copyholder during the time that the automatic apparatus is feeding the exposed portion of sheet material and severing it from the unexposed portion.

To give a brief resume of one complete cycle of operation, the action of the operator in pulling the cord 200 results in a rearward movement of the lower end of the actuating member 106. This withdraws the nose 109 from its initial or rest position shown in Fig. 8, and throws it to the position illustrated in Fig. 9, in which position the nose is then latched by the latch 112.

The withdrawal of the nose 109 allows outward movement of the tail 103 of the clutch element 96, under the influence of spring 98, and moves the nose 100 of this clutch element into the path of travel of the lug 101 on the constantly rotating gear 82. The lug 101 during its rotation thus comes into contact with the nose 100 of the clutch element and carries the control member 92 around with it.

Practically at the beginning of the rotation of this control element, the cam 120 thereon raises the roller 127 and shifts the shutter operating member 124 from the position shown in Fig. 8 to that shown in Fig. 9, in which latter position it is held by the latch 130 so that it remains in this position after the cam 120 moves on past the roller 127. This movement of the shutter operating member opens the shutter and commences the exposure. Subsequently, after a time interval which is variable in extent depending on the setting of the adjustable lug 134, this lug comes into contact with the arm 133 and shifts it to release the latch 130, thus permitting the shutter operating member 124 to be returned to its initial position by the spring 128. This closes the shutter and completes the exposure.

Early in the revolution of the control member 92, the cam 150 comes in contact with the roller 151 and moves the arm 152 on which this roller is mounted. This movement withdraws the sheet severing element 45 from the position shown in Fig. 3 to that shown in Fig. 4.

After the completion of the exposure, and while the severing element 45 is held in retracted position by the cam 150, the forward inclined edge of the cam 180, or of its supplementary extension 185, comes into contact with the arm 182 and shifts this arm to move the pin 174 axially inwardly, thus operatively connecting the rotating clutch element 163 to the clutch element 162 to drive the feed rolls 38 and 39. These rolls feed the sheet material to remove the exposed portion from the focal plane and to bring a fresh unexposed portion into the focal plane. The amount of sheet material which is fed depends, of course, on the length of time during which the clutch element 163 is held in engagement with the element 162, and this length of time depends, in turn, on the effective length of the cam 180, which may be varied by shifting the setting of the supplementary extension cam 185.

Near the end of the cycle or complete revolution of the control member 92 and shortly after the rear end of the cam 180 rides out from under the arm 182 and thus disconnects the sheet feeding clutch, the rear end of the cam 150 passes beyond the roller 151 and allows the spring 52 to move the sheet severing element 45 forwardly from the position shown in Fig. 4 to that shown in Fig. 3, thus severing the portion of the sheet which has previously been fed below the cross bar 50. At about this same time, shortly before the end of the complete revolution of the control member, the pin 114 thereon hits the nose 115 of the latch member 112 and releases this latch so that the nose 109 moves upwardly under the influence of the spring 110 and, at the completion of the revolution of the control member, enters the opening 104 therein to stop the control member accurately in the position of rest and to shift the tail 103 on the clutch member 96 to disconnect the control member 92 from the rotating gear 82.

When it is desired to open the magazine portion 34 either for replenishing the supply of sheet material or for any other reason, this may be done without interfering with the automatic mechanism, since this mechanism is principally mounted upon the magazine portion and swings as a unit therewith, and since the shaft 72 which drives the automatic mechanism is in alinement with the axis of the hinges which support the magazine section.

Focusing of the camera may also be accomplished without interfering with the automatic mechanism, since this mechanism moves back and forth as a unit with the camera body when the latter is shifted along the frame members 22, the universal joints 65 in the drive shaft 64 permitting this movement. The member 146 on the shutter operating cord 145 may be shifted easily to vary the effective length of this cord in response to the focusing movement of the camera.

This automatic camera operating mechanism may be easily applied to existing cameras, since the mechanism is principally mounted upon the magazine portion 34, and it is a comparatively easy matter to remove the old magazine portion and to substitute a new magazine portion which has the automatic mechanism applied to it. Many existing cameras are equipped with driving motors 62 and shafts 64 for driving the print treating mechanism. When it is desired to apply the automatic mechanism to such cameras, it is comparatively easy to put a gear 70 on the existing drive shaft 64, and to install a shaft 72, driven by this gear, for driving the automatic mechanism.

While one embodiment of the invention has been disclosed, it is to be understood that the inventive idea may be carried out in a number of ways. This application is therefore not to be limited to the precise details shown, but is intended to cover all variations and modifications thereof falling within the spirit of the invention or the scope of the appended claims.

I claim as my invention:

1. The combination with a camera including a shutter, sheet feeding devices, and a movable sheet severing element normally extending across the path of travel of a sheet fed by said devices, of automatic means effective when set into operation to operate said shutter, withdraw said severing element from said normal position, actuate said feeding devices, and operate said severing element to sever a sheet.

2. The combination with a camera including a shutter, sheet feeding devices, and a movable sheet severing element, of resilient means for moving said element to sheet severing position, and automatic means effective when set into operation to operate said shutter, withdraw said element against the action of said resilient means, actuate said feeding devices, and release said element for movement by said resilient means.

3. The combination with a camera including sheet feeding devices and a movable sheet severing element normally extending across the path of travel of a sheet fed by said devices, of automatic means effective when set into operation to withdraw said severing element from said normal position, actuate said feeding devices, and operate said severing element to sever a sheet.

4. The combination with a camera including sheet feeding devices and a movable sheet severing element, of means normally tending to move said element to a position extending across the path of travel of a sheet fed by said devices, and automatic means effective when set into operation to withdraw said severing element from said position, actuate said feeding devices, and release said element for movement by said first named means.

5. The combination with a camera including sheet feeding devices and a movable sheet severing element, of resilient means for moving said element to sheet severing position, and automatic means effective when set into operation to withdraw said element against the action of said resilient means, actuate said feeding devices, and release said element for movement by said resilient means.

6. The combination with a camera including sheet feeding devices and a movable sheet severing element, of automatic means effective when set into operation to actuate said feeding devices and to operate said severing element to sever the sheet fed by said devices, said automatic means being adjustable to actuate said feeding devices to variable extents.

7. The combination with a camera including sheet feeding devices and a movable sheet severing element, of automatic means effective when set into operation to actuate said feeding devices and to operate said severing element to sever the sheet fed by said devices, said automatic means including an adjustable cam for controlling the actuation of said feeding devices whereby said devices may be actuated to variable predetermined extents.

8. The combination with a camera including sheet feeding devices, of driving means therefor, clutch means connecting said feeding devices to said driving means, and a movable control member for controlling the action of said clutch means, said control member having a portion adjustable to vary the extent of driving imparted to said feeding devices by said driving means.

9. The combination with a camera including sheet feeding devices, of driving means therefor, clutch means connecting said feeding devices to said driving means, and a movable control member for controlling the action of said clutch means, said control member having a cam of variable length to vary the extent of driving imparted to said feeding devices by said driving means.

10. The combination with a camera including sheet feeding devices, of driving means therefor, clutch means connecting said feeding devices to said driving means, a movable control member driven in predetermined relation to said driving means, said control member having a cam including two portions one of which is shiftable relative to the other to vary the effective length of said cam, and an operative connection between said cam and said clutch means to determine the extent of driving imparted to said feeding devices by said driving means.

11. The combination with a camera including a shutter operating member arranged to open a shutter upon movement in one direction and to close the shutter upon movement in another direction, of a power driven control member arranged to move said shutter operating member in one direction at a fixed point in the travel of said control member and to move said arm in another direction at a variable point in the travel of the control member.

12. The combination with a camera including a shutter operating member arranged to open a shutter upon movement in one direction and to close the shutter upon movement in another direction, of a movable control member arranged to shift said shutter operating member in one direction at one point in the travel of said control member, a latch for retaining said operating member when it has been so shifted, and means for tripping said latch at another point in the travel of the control member.

13. The combination with a camera including a shutter operating member, of a movable control member arranged to shift said shutter operating member in one direction at one point in the travel of said control member, a latch for retaining said operating member when it has been so shifted, and means associated with said control member for tripping said latch at another point in the travel of the control member, said tripping means being shiftable to vary the point at which said latch is tripped relative to the travel of the control member, to vary the length of exposure.

14. The combination with a camera including a shutter operating member, of a movable control member, means for shifting said shutter operating member in one direction, and means for shifting said arm in another direction, said last named means including an element shiftable to various positions on said control member and means for retaining said element in the position in which it is set.

15. The combination with a camera including a shutter operating member, of a rotary control member for moving said shutter operating member, said control member including a cam for moving said operating member in one direction, latching means for holding said operating member in the position to which it is moved by said cam, and a latch tripping element movably mounted on said control member for adjustment to any one of a plurality of positions relative to said cam, to vary the interval between the actuation of said operating member by said cam and the tripping of said latch.

16. The combination with a camera including a shutter operating member, of means tending to move said operating member in one direction, a control member for moving said operating member in opposition to said means and for releasing said operating member to be returned by said means, and a resilient cushioning element cooperating with said operating member to cushion the return movement thereof under the influence of said means.

17. The combination with a camera including a shutter operating member, sheet feeding devices, and a sheet severing element, of a driven member, a control member, clutch means for operatively connecting said control member to said driven member to drive the former from the latter, mechanism for automatically disconnecting said clutch means to free said control member from said driven member at the end of a predetermined extent of movement of the control member, a second clutch means for operatively connecting said feeding devices to said driven member to drive the former from the latter, and mechanism associated with said control member for moving said shutter operating member, operating said second clutch means, and operating said sheet severing element, said mechanism including a part settable to any one of a plurality of positions to vary the action of said control member on said second clutch means, to cause said feeding devices to be driven selectively through variable amounts.

18. In a photographic apparatus, the combination with a camera body having a magazine portion pivotally connected to another portion of said body for movement relative thereto, of mechanism mounted on said magazine portion for feeding and severing sheet material, power means, and a driving connection between said power means and said mechanism including a member in alignment with the axis of the pivotal connection.

19. A commercial copying camera comprising a frame, a copyholder projecting forwardly therefrom, a camera having a lens in position to receive light rays from objects placed on said copyholder, sensitized sheet feeding devices, a sheet severing element, a source of power, a control member arranged to be connected to said source of power and effective when so connected to operate the camera shutter, actuate said feeding devices, and operate said severing element automatically, said control member being located at a point removed from said copyholder, and means including an operating member adjacent said copyholder and easily accessible to an operator stationed thereat, for connecting said control member to said source of power to expose, feed, and sever a sheet automatically.

ARTHUR W. CAPS.